(12) United States Patent
Sydow et al.

(10) Patent No.: US 8,695,002 B2
(45) Date of Patent: Apr. 8, 2014

(54) MULTI-THREADED PROCESSORS AND MULTI-PROCESSOR SYSTEMS COMPRISING SHARED RESOURCES

(75) Inventors: Carsten Sydow, Ottobrunn (DE); Gunther Fenzl, Hoehenkirchen-Siegertsbrunn (DE)

(73) Assignee: Lantiq Deutschland GmbH, Neubiberg (DE)

( * ) Notice: Subject to any disclaimer, the term of this patent is extended or adjusted under 35 U.S.C. 154(b) by 866 days.

(21) Appl. No.: 12/581,989

(22) Filed: Oct. 20, 2009

(65) Prior Publication Data

US 2011/0093857 A1 Apr. 21, 2011

(51) Int. Cl.
*G06F 9/46* (2006.01)
(52) U.S. Cl.
USPC .......................... 718/102; 718/100
(58) Field of Classification Search
None
See application file for complete search history.

(56) References Cited

U.S. PATENT DOCUMENTS

| | | | | |
|---|---|---|---|---|
| 6,003,061 A * | 12/1999 | Jones et al. | | 718/104 |
| 6,606,691 B2 * | 8/2003 | Didier et al. | | 711/151 |
| 7,093,262 B2 * | 8/2006 | Ma et al. | | 719/310 |
| 7,216,204 B2 * | 5/2007 | Rosenbluth et al. | | 711/141 |
| 7,281,043 B1 * | 10/2007 | Davie | | 709/226 |
| 7,363,474 B2 * | 4/2008 | Rodgers et al. | | 712/227 |
| 7,987,346 B2 * | 7/2011 | Burns et al. | | 712/228 |
| 8,131,983 B2 * | 3/2012 | Babich | | 712/228 |
| 8,302,098 B2 * | 10/2012 | Johnson et al. | | 718/102 |
| 2002/0103990 A1 * | 8/2002 | Potash | | 712/215 |
| 2002/0199088 A1 * | 12/2002 | Burns et al. | | 712/228 |
| 2002/0199089 A1 * | 12/2002 | Burns et al. | | 712/228 |
| 2003/0126186 A1 * | 7/2003 | Rodgers et al. | | 709/107 |
| 2004/0078794 A1 * | 4/2004 | Burns et al. | | 718/100 |
| 2004/0187120 A1 * | 9/2004 | Moore et al. | | 718/100 |
| 2004/0215942 A1 | 10/2004 | Hansen et al. | | |
| 2005/0198644 A1 * | 9/2005 | Jiang et al. | | 718/107 |
| 2006/0117316 A1 * | 6/2006 | Cismas et al. | | 718/103 |
| 2006/0136915 A1 * | 6/2006 | Aingaran et al. | | 718/100 |
| 2006/0136919 A1 | 6/2006 | Aingaran et al. | | |
| 2006/0214934 A1 * | 9/2006 | Foote | | 345/473 |
| 2007/0043916 A1 * | 2/2007 | Aguilar et al. | | 711/150 |
| 2007/0094664 A1 | 4/2007 | So et al. | | |
| 2008/0022283 A1 * | 1/2008 | Krieger et al. | | 718/104 |
| 2008/0187053 A1 * | 8/2008 | Zhao et al. | | 375/240.25 |
| 2008/0229321 A1 * | 9/2008 | Krieger et al. | | 718/104 |
| 2009/0083741 A1 * | 3/2009 | Krishnan et al. | | 718/102 |
| 2009/0144742 A1 * | 6/2009 | Subhraveti et al. | | 718/104 |
| 2009/0217277 A1 | 8/2009 | Johnson et al. | | |
| 2009/0271789 A1 * | 10/2009 | Babich | | 718/100 |
| 2010/0153945 A1 * | 6/2010 | Bansal et al. | | 718/1 |

OTHER PUBLICATIONS

MIPS Technologies, Inc., "MIPS MT ASE Definitions," "MIPS MT Principles of Operation," Jan. 25, 2007, p. 6, Rev. 1.01, Sunnyvale, CA.

* cited by examiner

*Primary Examiner* — Van Nguyen
(74) *Attorney, Agent, or Firm* — Murphy, Bilak & Homiller, PLLC

(57) ABSTRACT

An apparatus is provided comprising at least two processing entities. Shared resources are usable by a first and a second processing entity. A use of the shared resources is detected, and the execution of instructions associated with said processing entities is controlled based on the detection.

14 Claims, 3 Drawing Sheets

MULTI-THREADED PROCESSORS AND MULTI-PROCESSOR SYSTEMS COMPRISING SHARED RESOURCES

BACKGROUND OF THE INVENTION

The present invention relates to multi-threaded processors and multi-processor systems comprising shared resources.

In current multi-threaded processor cores, hardware resources are implemented in order to execute multiple so-called threads of execution, sometimes shortly referred to as threads, quasi simultaneously. A hardware scheduler decides in each clock cycle which instruction for which thread is to be issued into a main processor pipeline, where the instruction is then executed. This decision is based for example on the availability of instructions per (runnable) thread. Typical scheduling policies used in such a scheduler are Round Robin, where each thread executes an instruction in turn, Weighted Round Robin or other priority-based algorithms, in which for example real-time threads of execution may enjoy a higher priority than non-real-time threads of execution.

In multi-threaded processor cores or multi-threaded processors the so-called thread context, for example a program counter or so-called core register file, is implemented in hardware per thread, i.e. each thread has its own thread context. On the other hand, other portions of such a processor are shared resources, i.e., elements used by two or more threads. Examples for such shared resources are for example a level 1 instruction cache (L1I$), a level 1 data cache (L1D$), the above-mentioned main pipeline, a load store unit (LSU) including Fill Store Buffers, a Multiply Divide Unit (a unit used for executing multiplications or divisions) or an ALU (Arithmetic Logic Unit). In such environments, it may happen that one thread of execution uses such shared resources to an amount that other threads of executions are significantly slowed down. For example, in an embedded system where a non-real-time operating system like LINUX runs on one thread of execution and a real-time operating system, for example a voice processor, runs on another thread of execution, situations may occur where the voice processor is not able to execute the amount of instructions which is required to maintain real-time behavior. It should be noted that this situation may occur even though the above-mentioned scheduler assigns sufficient time slots for execution to the real-time thread of execution, as execution of instructions may be stalled due to occupied shared resources.

A somewhat similar situation may occur in multi-processor systems or systems with multiple processor cores, which also share some resources, for example a DRAM, a level 2 cache or a level 3 cache.

BRIEF SUMMARY OF THE INVENTION

According to an embodiment, a data processing apparatus is provided, comprising:
  a first processing entity,
  a second processing entity,
  shared resources usable by said first processing entity and by said second processing entity,
  wherein said apparatus is configured to detect a use of shared resources by said first processing entity and said second processing entity and control execution of instructions associated with said first processing entity and said second processing entity based on said detection.

It should be noted that the above summary is only intended to provide an abbreviated overview over some features of some embodiments of the present invention, and the present invention is not limited to these features, as different embodiments may comprise different features.

DETAILED DESCRIPTION OF THE INVENTION

Figure 1:
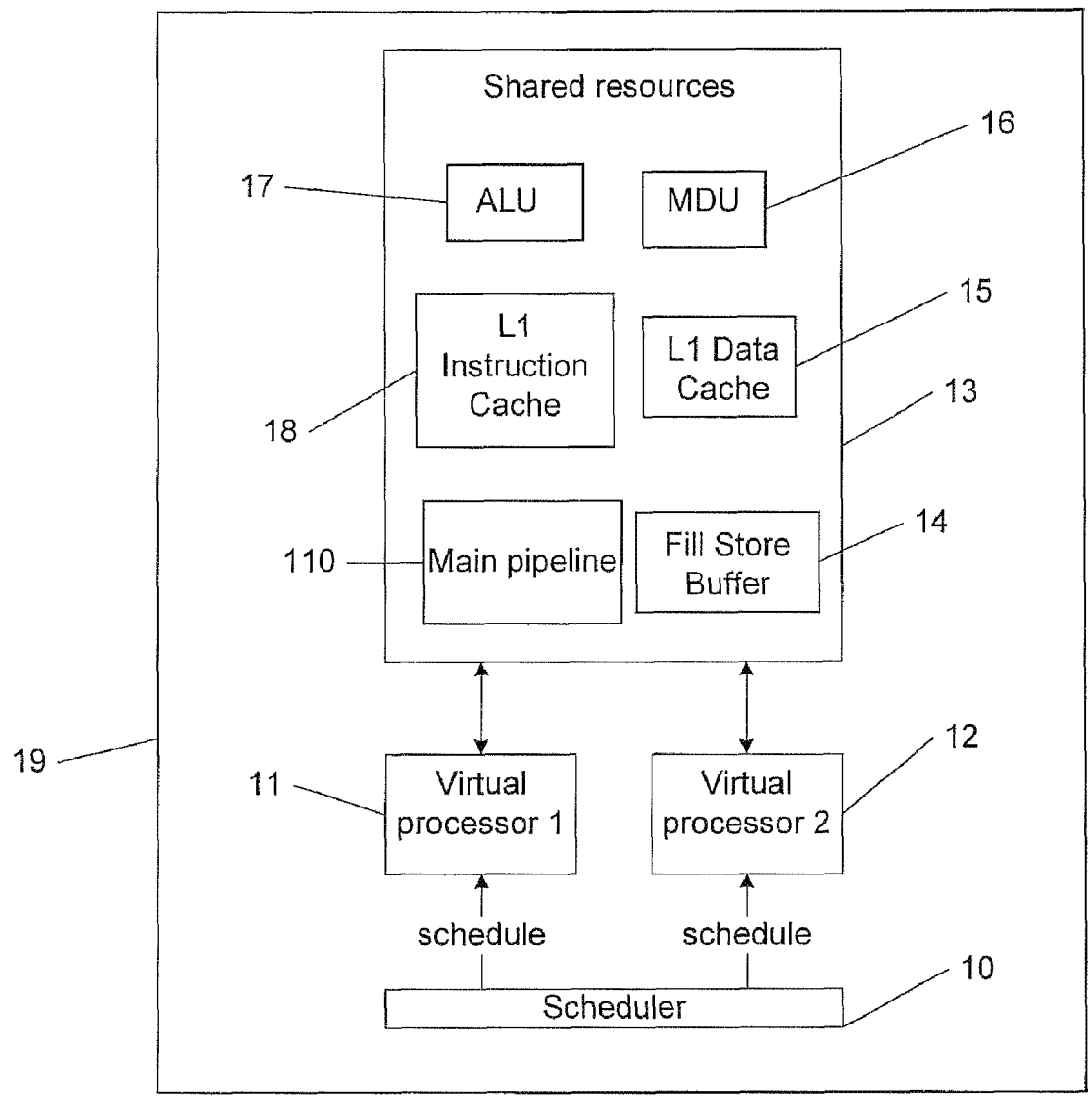
FIG. 1 shows a block diagram of an embodiment.

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e., a connection or coupling comprising one or more intervening elements. Furthermore, it should be noted that depicting various functional blocks or units in the drawings is not intended to indicate that these functional blocks or units are necessarily implemented separately. Instead, such separate blocks or units may be implemented as separate circuits, but may also be fully or partially implemented in a common circuit, for example a common processor, in other embodiments. Furthermore, such separate functional blocks or units may be fully or partially implemented in hardware and/or fully or partially be implemented in software unless noted to the contrary.

It should be noted that the drawings are provided to give an illustration of some aspects of embodiments of the present invention and therefore are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative locations of the various components in implementations according to an embodiment of the invention.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

In some of the following embodiments, data processing systems capable of executing multiple threads of execution, also referred to as threads in the following, simultaneously, are provided. Such threads of execution may for example be a program, an operating system or a voice processor. A thread of execution may be a sequential instruction stream. Examples for such systems are multi-threaded processors or processor cores (a single processor may comprise more than one of such cores) or systems having multiple processors or multiple processor cores within a single processor. Also mixtures of the above possibilities are possible, for example a multi-processor system where each processor comprises a plurality of processor cores or a processor comprising a plurality of processor cores, one or more of these cores being a multi-threaded core.

Generically, portions of such a system dedicated to the execution of a single thread of execution will be referred to as processing entity. In multi-threaded processor cores, such a processing entity may comprise a virtual processing element. A virtual processing element, or VPE, may be an instantiation of the full instruction set architecture and privileged resource architecture of the processor, sufficient to run for example a per-processor operating system image. A VPE can be thought of as an "exception domain", as exception state and priority apply globally within a VPE, and only one exception can be dispatched at a time on a VPE. The processing entity may be associated with a thread context. A thread context, or TC, may be the hardware state necessary to support a thread of execution. This may include a set of general purpose registers, a program counter, and/or some multiplier and coprocessor state. In multi-processor systems, each processing entity may comprise a processor. In embodiments of the present invention, for example the embodiments described hereinafter, the processing entities are at least partially implemented in hardware.

In contrast thereto, shared resources are generally used to designate components of the respective system or apparatus which are commonly used for executing more than one thread of execution. In the context of a multi-threading processor core, such shared resources may for example comprise a level 1 instruction cache (L1I$), a level 1 data cache (L1D$), one or more buffers, a main pipeline or components for performing specific mathematical operations. In the context of a multi-processor system, such shared components may for example comprise a level 2 cache, a level 3 cache or a DRAM memory or controller thereof. The above examples, however, are not to be construed as limiting.

Turning now to the figures, in FIG. 1 an embodiment of the present invention is shown. The embodiment of FIG. 1 shows a multi-threaded processor 19 with a plurality of virtual processors for essentially simultaneously executing a plurality of threads of execution. As an example, in FIG. 1 a first virtual processor 11 and a second virtual processor 12 are shown. However, the number of virtual processors and therefore simultaneously executable threads of execution is not limited to two, but may be any desired number according to the implementation of multi-threaded processor core 19. A corresponding processor may comprise one or more of such multi-threaded processor cores 19. The first virtual processor 11 and the second virtual processor 12 are "seen" by software as an independent processor core. For example, on each virtual processor a separate operating system may be executed. The first virtual processor 11 and the second virtual processor 12 each comprises a thread context, which may comprise for example a program counter or a core register file, for running an instruction sequence, i.e., a thread of execution. It should be noted that generally thread context in the context of this application refers to the hardware portion dedicated to a specific thread of execution. Virtual processor 11 and virtual processor 12 are therefore examples for processing entities each comprising a thread context.

Furthermore, multi-threaded processor core 19 comprises shared resources generally labeled 13 in FIG. 1. As examples for shared resources, a Fill Store Buffer 14, a level 1 data cache 15, a Multiply Divide Unit 16, an Arithmetic Logic Unit 17, a level 1 instruction cache 18 and a main pipeline 110 are shown. It should be noted that the above-described shared resources serve only as examples, and in other embodiments other shared resources and/or only some of the shared resources depicted in FIG. 1 may be implemented.

Generally, for executing a thread of execution, both a thread context dedicated to a respective thread and shared resources are used. A scheduler 10 is provided which assigns time slots for execution of instructions of respective threads executed on first virtual processor 11 and second virtual processor 12, i.e., for forwarding such instructions to main pipeline 110 and execution in the embodiment shown.

In an embodiment, the scheduling performed by scheduler 10, i.e., the assignment of time slots to first virtual processor 11 and second virtual processor 12, is done based on the usage of shared resources by the threads executed by the respective virtual processor. For example, if a thread intensively using shared resources thereby slowing another thread on another virtual processor down, the scheduler 10 may assign less time slots to the thread intensively using the shared resources to enable a timely advancement of one or more other threads. This control of scheduler 10 based on the usage of shared resources may be implemented in hardware, software, firmware or combinations thereof.

Additional considerations for scheduling may comprise how urgent other threads require the use of shared resources as well as whether threads are real-time threads (for example a voice or video processor) or non-real-time threads (for example an operating system like LINUX).

Figure 2:
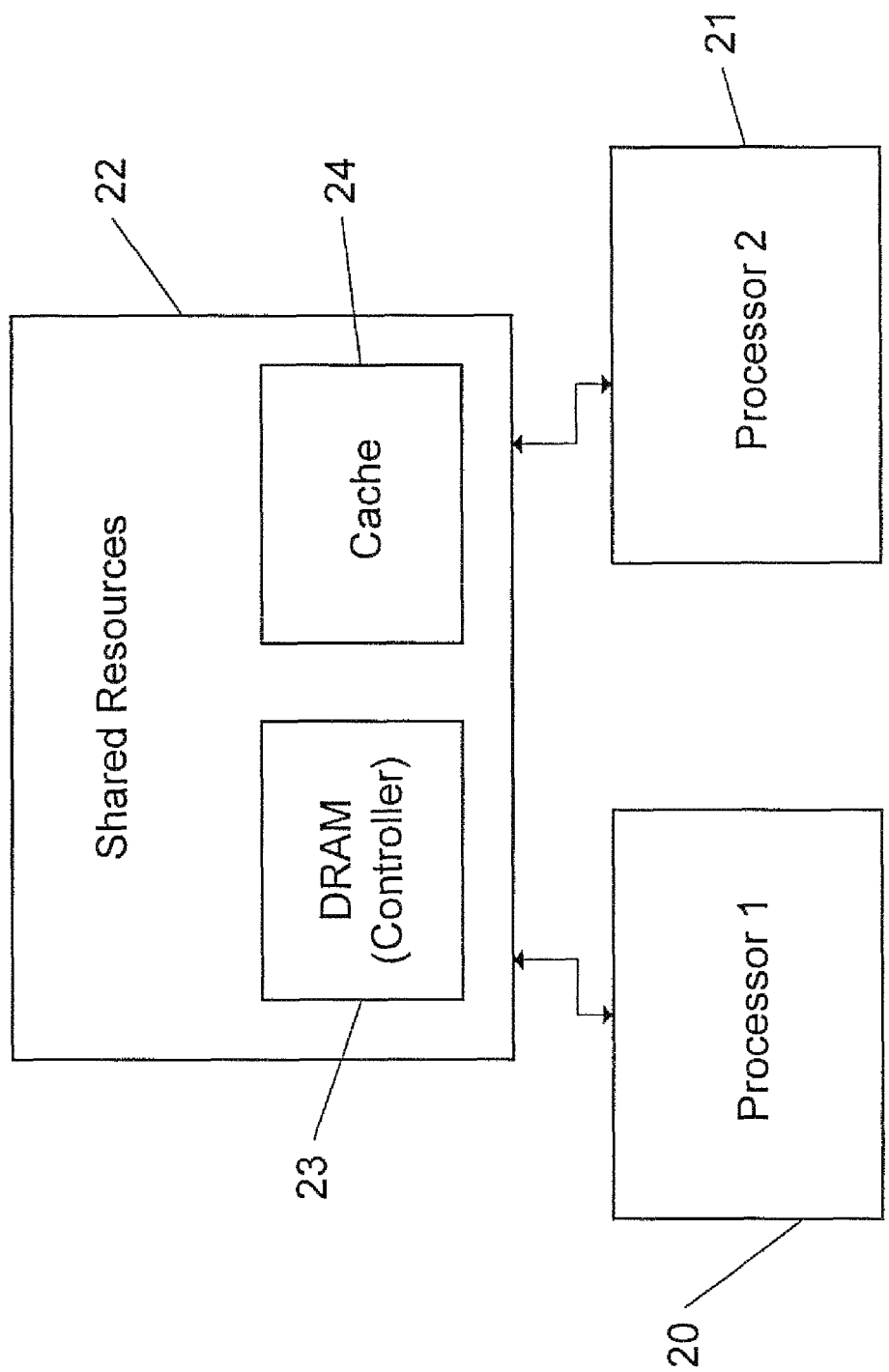
FIG. 2 shows a block diagram of an embodiment.

In FIG. 2, another embodiment of the present invention is shown. In the embodiment of FIG. 2, a first processor 20 and a second processor 21 are provided. First processor 20 and second processor 21 use shared resources 22, which may for example comprise a DRAM 23, for example a SDRAM, a corresponding DRAM controller, a level 2 and/or level 3 cache 24. Also in this embodiment it may be monitored if one of processors 20, 21 exceedingly uses shared resources 22 and may be slowed down accordingly to give the respective other processor the opportunity to also use sufficient shared resources. This control of first processor 20 and second processor 21 may be performed by a separate scheduler or for example also by software running on first processor 20 or second processor 21.

It should be noted that the number of two processors in FIG. 2 serves merely as an example, and more than two processors may be implemented. First processor 20 and second processor 21 are examples for processing entities.

Figure 3:
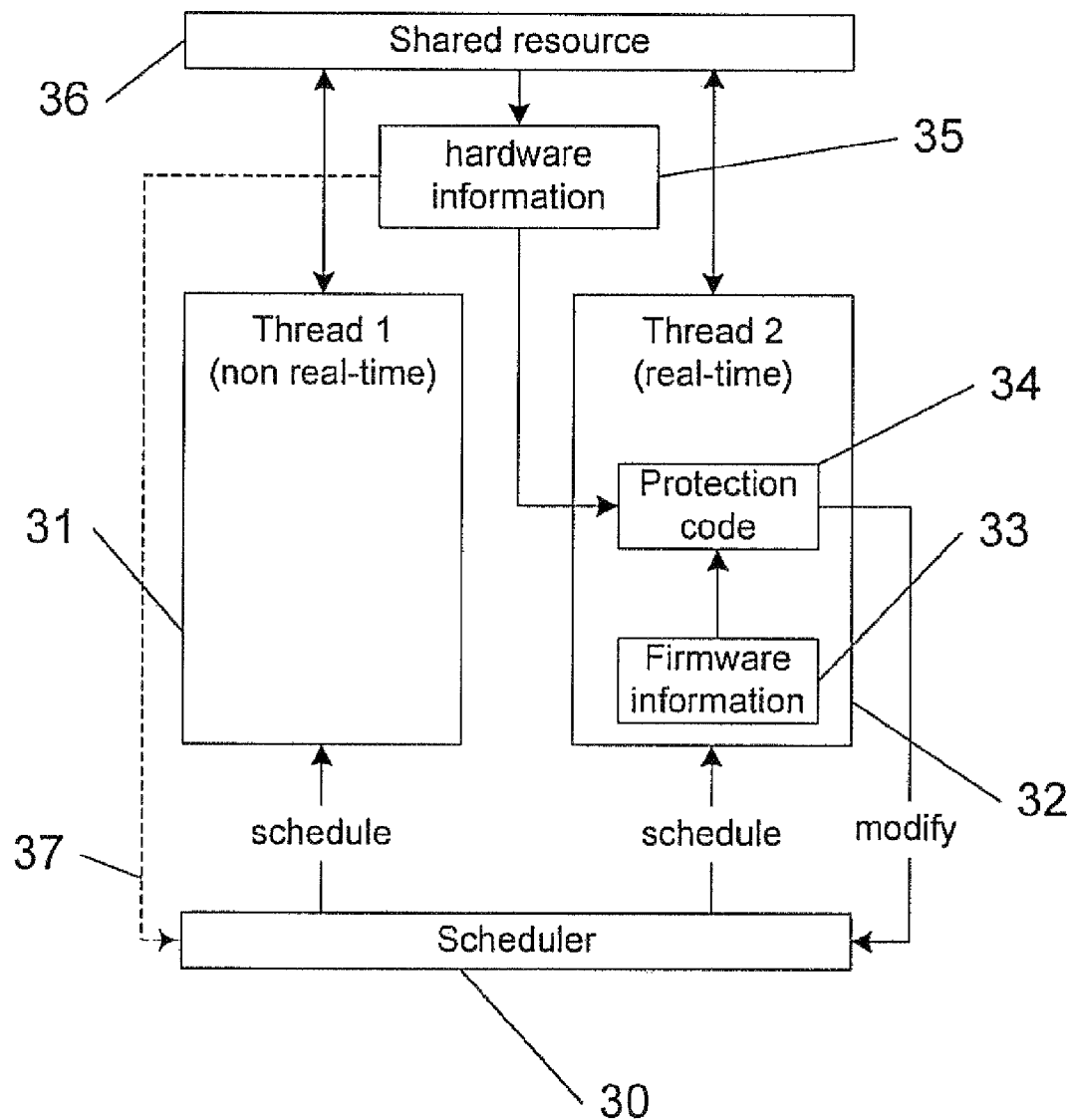
FIG. 3 shows a block diagram of an embodiment.

In FIG. 3, a further embodiment of a processing system according to the present invention is schematically shown.

In the embodiment of FIG. 3, a first thread 31 and a second thread 32 are executed quasi simultaneously. For example, in an environment similar to the one shown in FIG. 1, threads 31, 32 may be executed on different virtual processors in a multi-threaded processor, i.e., with separate thread contexts, while in an embodiment similar to the one shown in FIG. 2 threads 31, 32 may be executed on different processors or different processor cores.

A scheduler 30 assigns time slots for the execution of thread 31 and thread 32.

In the embodiment of FIG. 3, first thread 31 is a non-real-time thread, for example an operating system like LINUX, while second thread 32 is a real-time thread, for example a voice processing thread or a video processing thread.

First thread 31 and second thread 32 both require one or more shared resources 36 for execution.

In the embodiment of FIG. 3, a hardware information unit 35 which may be implemented in hardware checks parameters related to the processing entities running the threads 31, 32. For example, in a system similar to the one depicted in FIG. 1 with shared resources as explained for this figure, hardware information unit 35 may for example check parameters related to the thread contexts of threads 31, 32 like:

- The number of instructions of a thread associated with a thread context, executed in a predetermined time interval. A low number of instructions in the executed time interval may indicate that instructions take longer to be executed than usual, possibly due to waiting for a shared resource.
- The number of Fill Store Buffer entries a thread context uses. A high number of Fill Store Buffer entries may impede the execution of other threads.
- A number of stalls per time interval a thread context produces.
- A number of instruction and data cache accesses and a resulting number of cache misses per time interval a thread context produces.
- An occupation of a Multiply Divide Unit or an Arithmetic Logic Unit per time interval caused by a thread context
- The type of instructions executed by different threads, like load/store, multiply, branching instructions.

In an embodiment with a system similar to the one shown in FIG. 2, a corresponding hardware may for example check a DRAM, for example DDR-SDRAM, and/or non-volatile memory bus latency.

It should be noted that while in some embodiments a plurality of or all of the above parameters may be checked, in other embodiments only a few or a single one of these parameters may be checked by hardware information unit 35.

In an embodiment, upper limit values for each parameter which is checked are preconfigured and for example stored in hardware information unit 35. This configuration may for example be performed by a corresponding software. Hardware information unit 35 then compares the determined parameters with the upper limits and sends a status signal indicating an exceeding of the respective parameter.

In an embodiment, as indicated by a dashed arrow 37 in FIG. 3, the corresponding information may be directly submitted to scheduler 30, which then slows or temporarily deactivates the thread, i.e., the respective processing entity, which caused the exceeding of the respective threshold values. In another embodiment, a software program, which is labeled protection code and bears reference numeral 34 in the embodiment of FIG. 3, receives the output status signal from hardware information unit 35.

In the embodiment of FIG. 3, protection code 34 additionally receives firmware information from a firmware information portion 33 which in the embodiment shown is part of the firmware for the second thread 32, i.e., the real-time thread in the embodiment of FIG. 3. For example, the firmware information portion may be part of a voice processing firmware.

Firmware information portion 33 may for example check if uncritical real-time events or time markers have been violated. For example, in predetermined time intervals, for example every 0.1 ms, 0.5 ms or 2.5 ms a dedicated code sequence may be executed, for example a code sequence which accesses shared resources, and the proper execution is monitored. If the code sequence is not executed properly, for example not executed within a predetermined time frame, this does not cause a malfunction of the real-time system, but indicates a potentially critical overload condition, i.e., a condition where the execution of instructions of the real-time thread 32 is delayed. If this is the case, firmware information portion 33 sends a corresponding status signal to protection code 34 in the embodiment of FIG. 3.

Protection code 34 may be a part of the code, i.e., the sequence of instructions, of second thread 32, but may in another embodiment also run on a separate processing entity, i.e., be a separate thread. In an embodiment, the protection code periodically checks the status signals received from hardware information unit 35 and firmware information portion 33 and controls scheduler 30 depending on these status signals. Protection code 34 may be tailored to the respective real-time thread 32 to take only those status signals into account which indicate a condition potentially impeding the execution of thread 32. Protection code 34 then may control scheduler 30 to "throttle", i.e., slow down, first thread 31. For example, scheduler 30 may be controlled such that only every second and every fourth, every eight . . . , every 256th instructions of first thread 31 is executed compared to a situation without the "throttling", i.e., without any status signals indicating a potential problem for execution of real-time thread 32.

In an embodiment where protection code 34 runs on a separate processing entity, protection code 34 in an embodiment is only started when at least one of the status signals generated by hardware information unit 35 indicates an exceeding of a limit value and/or a status signal generated by firmware information portion 33 indicates an improper execution of the above-mentioned dedicated code sequence. In other embodiments, other events than status signals may trigger the execution of the protection code 34, for example if a predetermined usage level of a shared resource is exceeded.

The above-mentioned "throttling" can be implemented in addition to any conventional scheduling policy like Round Robin or Weighted Round Robin. For example, a Weighted Round Robin algorithm may be used where the throttling is represented by an additional "throttle weight" assigned to the respective threads.

It should be noted that the above embodiments only serve as examples, and numerous modifications and variations are possible, some of which will be described below.

While in the embodiments two processing entities or two threads are shown, the present invention is not limited thereto, and more than two processing entities running corresponding threads may be present. Moreover, while in FIG. 3 non-real-time thread and a real-time thread are depicted, in another embodiment more than one real-time thread or more than one non-real-time thread may be present. In the case of a plurality of real-time threads, for example a voice thread and a video thread, different real-time threads may have different demands for shared resources, which may be controlled by the above-described mechanisms.

In another embodiment, parameters of the system like a temperature of the system may be considered as indicating intensive use of a shared resource. For example, if the execution of one thread causes a heating up of corresponding parts of the system, this thread may be throttled.

Therefore, the scope of the present application is not to be limited by the above-described embodiments, but is intended to be limited only by the appended claims and equivalents thereof.

What is claimed is:

1. A multi-threaded processor core comprising:
   a first thread context associated with the execution of a first thread,
   a second thread context associated with the execution of a second thread,
   a scheduler to assign time slots for execution of said first thread and said second thread,
   shared resources usable both for execution of said first thread and execution of said second thread,
   a hardware unit that detects use of said shared resources by said first thread and said second thread, and firmware associated with said second thread context, wherein said firmware periodically executes test instructions and reports irregularities in said execution.

2. The processor core of claim 1, wherein said hardware unit is coupled directly to said scheduler, and wherein said scheduler modifies said assignment of time slots based on signals received from said hardware unit.

3. The processor core of claim 1, further comprising executable software to evaluate signals received from said hardware unit and to control said scheduler based on said received signals.

4. The processor core of claim 3, wherein said firmware reports said irregularities in said execution to said executable software.

5. The processor core of claim 3, wherein said executable software is run periodically.

6. The processor core of claim 3, wherein said executable software is run on a third thread context.

7. The processor core of claim 1, wherein said second thread is a real-time thread.

8. The processor core of claim 7, wherein said real-time thread is associated with one of the groups consisting of voice processing and video processing.

9. The processor core of claim 1, wherein said first thread is associated with running an operating system.

10. The processor core of claim 1, wherein said shared resources comprise one or more elements selected from the group consisting of a Fill Store Buffer, a buffer, a level 1 data cache, a level 1 instruction cache, a Multiply Divide Unit and an Arithmetic Logic Unit.

11. The processor core of claim 1, wherein said hardware unit is configured to check one or more parameters selected from the group consisting of a number of instructions said first context executes in a time interval, a number of instructions said second thread context executes in a time interval, a number of Fill Store Buffer entries said first thread context uses, a number of Fill Store Buffer entries said second thread context uses, a number of stalls said first thread context produces, a number of stalls said second thread context produces, a number of instruction cache accesses said first thread context produces, a number of instruction cache accesses said second thread context produces, a number of data cache accesses said second thread context produces, a number of data cache accesses said second thread context produces, a number of cache misses per time interval said first thread context produces, a number of cache misses per time interval said second thread context produces, an occupation of a Multiply Divide Unit per time interval caused by said first thread context, an occupation of a Multiply Divide Unit per time interval caused by said second thread context, a type of instructions executed on said first thread context, a type of instructions executed on said second thread context, an occupation of an arithmetic logic unit per time interval said first context causes and an occupation of an arithmetic logic unit per time interval said second context causes.

12. A method of operating a multi-threaded processor core including a first thread context, a second thread context and firmware, the method comprising:
executing a first thread associated with said first thread context,
executing a second thread associated with said second thread context,
assigning time slots for execution of said first thread and said second thread,
providing shared resources usable both for execution of said first thread and execution of said second thread,
detecting use of said shared resources by said first thread and said second thread,
periodically executing test instructions via said firmware, and
reporting irregularities in said execution via said firmware.

13. The method of claim 12, wherein said irregularities in said execution are reported to executable software.

14. The method of claim 13, wherein said executable software is run periodically.

* * * * *